(12) United States Patent
Riley et al.

(10) Patent No.: US 7,826,685 B2
(45) Date of Patent: Nov. 2, 2010

(54) SPATIAL AND SPECTRAL CALIBRATION OF A PANCHROMATIC, MULTISPECTRAL IMAGE PAIR

(75) Inventors: Ronald Alan Riley, West Melbourne, FL (US); Tariq Bakir, Melbourne, FL (US); Adrian M. Peter, Gainesville, FL (US); Morteza Akbari, Rockledge, FL (US)

(73) Assignee: Harris Corporation, Melbourne, FL (US)

( * ) Notice: Subject to any disclaimer, the term of this patent is extended or adjusted under 35 U.S.C. 154(b) by 1005 days.

(21) Appl. No.: 11/565,703

(22) Filed: Dec. 1, 2006

(65) Prior Publication Data
US 2008/0129752 A1 Jun. 5, 2008

(51) Int. Cl.
| | |
|---|---|
| G06K 9/00 | (2006.01) |
| G06K 9/40 | (2006.01) |
| G06K 9/32 | (2006.01) |
| G06K 9/36 | (2006.01) |
| G09G 5/00 | (2006.01) |
| G09G 5/02 | (2006.01) |

(52) U.S. Cl. ............... 382/299; 382/100; 382/162; 382/254; 382/276; 345/589; 345/606

(58) Field of Classification Search ............ 382/100, 382/162, 254, 274, 276, 284, 293, 299; 348/362, 348/364; 345/589
See application file for complete search history.

(56) References Cited

U.S. PATENT DOCUMENTS

| | | | |
|---|---|---|---|
| 5,949,914 | A | 9/1999 | Yuen |
| 6,011,875 | A | 1/2000 | Laben et al. |
| 6,937,774 | B1 | 8/2005 | Specht et al. |
| 2004/0075667 | A1 | 4/2004 | Burky et al. |
| 2004/0141659 | A1* | 7/2004 | Zhang ............... 382/284 |
| 2004/0264796 | A1 | 12/2004 | Turner et al. |

(Continued)

FOREIGN PATENT DOCUMENTS

WO 9841079 9/1998

(Continued)

OTHER PUBLICATIONS

Aiazzi et al, "Context-Driven Fusion of High Spatial and Spectral Resolution Images Based on Oversampled Multiresolution Analysis", IEEE Transactions on Geoscience and Remote Sensing, vol. 40, No. 10, Oct. 2002.*

(Continued)

*Primary Examiner*—Brian Q Le
*Assistant Examiner*—Nathan Bloom
(74) *Attorney, Agent, or Firm*—Fox Rothshild, LLP; Robert J. Sacco

(57) ABSTRACT

Method and system for creating a fused image from an image pair comprising a high resolution panchromatic image and lower resolution multi-spectral image. The method includes obtaining image data (204) defining a first image of a panchromatic image type and a second image of a multi-spectral image type. The first image has a first spatial resolution and a first spectral resolution. The second image has a second spatial resolution which is lower than the first spatial resolution and a second spectral resolution higher than the first spectral resolution. The method also includes a step (212) of concurrently calculating a point-spread function for down-sampling the first image to the second spatial resolution, and a set of weights for down-sampling the second image to the first spectral resolution.

22 Claims, 6 Drawing Sheets

U.S. PATENT DOCUMENTS

2005/0094887 A1    5/2005    Cakir et al.
2005/0111754 A1    5/2005    Cakir et al.

OTHER PUBLICATIONS

Yun Zhang, "Understanding Image Fusion", Phogrammetric Engineering and Remote Sensing, Jun. 2004.*

Hardie, Eismann, and Wilson, "MAP Estimation for Hyperspectral Image Resolution Enhancement Using an Auxiliary Sensor", IEEE Transactions on Image Processing, vol. 13, No. 9, Sep. 2004.*

Aiazzi et al, "An MTF-Based Distortion Minimized Model for Pan-Sharpening of Very High Resolution Multispectral Images of Urban Areas", 2nd GRSS/ISPRS Joint Workshop on "Data Fusion and Remote Sensing over Urban Areas" 2003.*

Thomas et al., "Synthesis of Multispectral Images to High Spatial Resolution: A Critical Review of Fusion Methods Based on Remote Sensing Physics", IEEE Transactions on Geoscience and Remote Sensing, vol. 46, No. 5, May 2008.*

Aanaes, H., et al., "Spectrally Consistent Satellite Image Fusion With Improved Image Priors". 2006 7th Nordic Signal Processing Symposium (IEEE Cat. No. 06EX1392) IEEE Piscataway, NJ USA, Jun. 7, 2006-Jun. 9, 2006, pp. 14-17, XP002482502; ISBN: 1-4244-0413-4.

Garzelli, A., et al., "Interband Structure Modeling for Pan-Sharpening of Very High-Resolution Multispectral Images". Information Fusion, Elsevier, vol. 6, No. 3, Sep. 2005, pp. 213-224, XP004858824, ISSN: 1566-2535.

* cited by examiner

SPATIAL AND SPECTRAL CALIBRATION OF A PANCHROMATIC, MULTISPECTRAL IMAGE PAIR

BACKGROUND OF THE INVENTION

1. Statement of the Technical Field

The invention concerns image processing, and more particularly, to an image processing method for calibrating images having different resolutions, for example, spatial and spectral resolutions.

2. Description of the Related Art

In the field of remote image sensing, two common types of images include panchromatic imagery and multi-spectral imagery. Panchromatic imagery is imagery that is obtained by a remote sensing device with a sensor designed to detect electromagnetic energy in only one very broad band. This one very broad band typically includes most of the wavelengths of visible light Panchromatic imagery has the advantage of offering very high spatial resolution. In contrast, multi-spectral imagery is typically created from several narrow spectral bands within the visible light region and the near infrared region. Consequently, a multi-spectral image is generally comprised of two or more image data sets, each created by sensors responsive to different portions of the optical spectrum (e.g., blue, green, red, infrared). Multi-spectral images are advantageous because they contain spectral information which is not available from a similar panchromatic image. However, multi-spectral images typically have a lower spatial resolution as compared to panchromatic images.

It is often desirable to enhance a multi-spectral image with the high resolution of a panchromatic image. In order to achieve this result, it is known in the art that the images can be combined or "fused". In general, there are two key problems that must he solved in order to accomplish this fusing process. The first problem concerns a need for registration of the two images. The registration process involves a determination of where each pixel in the panchromatic image maps to in the multi-spectral image. This process must generally be accomplished with great accuracy for best results. For example, it is desirable to for each pixel in the pan image to be mapped to the multi-spectral image with an accuracy of less than 0.1 panchromatic pixel radius. A number of conventional methods exist for achieving this mapping. The second problem that must be overcome when performing the fusing process is to ensure that the radiance values of the fused image remain consistent with (1) the original multi-spectral image and (2) the original panchromatic image. Item (1) requires some means of obtaining an estimate of the weights that should be applied to radiance values for pixels associated with each band of wavelengths in the fused image. If these weights are known, then it is possible to make an accurate comparison of the radiance values of pixels in the fused image to the pixels in the original panchromatic image. Item (2) requires some means of determining the spatial distribution of weights that should be applied to each pixel contained in a region of the fused image which have are collectively mapped to an area corresponding to each pixel in the multi-spectral image. If the spatial distribution of weights is known, then it is possible to make an accurate comparison of the radiance value in the fused image with the radiance values in each band of the multi-spectral image. Such an evaluation can ensure consistency of radiance values as between the original multi-spectral image and the fused image.

Conventional algorithms utilized for performing the image fusion process suffer from several limitations. For example, they generally make simplistic assumptions about the manner in which the high spatial resolution pixels in the panchromatic images should be combined or fused with the high spectral resolution pixels of the multi-spectral image. Typically, these include (1) an assumption that high spatial resolution pixels from the panchromatic image down-sample to the low spatial resolution of the multi-spectral image as a box average; and (2) an assumption that the pixels from the panchromatic image are evenly weighted averages of red, green and blue spectral bands.

Some algorithms have also adopted a slightly more sophisticated approach with regard to the process of down-sampling pixels from the high resolution of the panchromatic image to the relatively low resolution of the multi-spectral image. For example, in some algorithms, the high spatial resolution pixels from the panchromatic image are not merely down-sampled as a box average. Instead, a point-spread function (PSF) is used to determine the manner in which the high spatial resolution pixels from the panchromatic image are down-sampled to the pixels consistent with the multi-spectral image. The PSF (sometimes referred to as instrument line shape) is a characterization of the manner in which a point of light is blurred or diffused by a sensor and its associated optics. Accordingly, knowledge regarding the PSF of a sensor can be useful for down-sampling the high spatial resolution pixels from the panchromatic image to the multi-spectral image. In particular, the PSF can be used to define a weighting system for combining individual ones of a plurality of high resolution pixels to form a single larger pixel at lower resolution. However, the PSF in conventional algorithms has merely been approximated based on sensor geometry data, such as aperture, focal plane resolution, and so on. As such, the PSF that is used is not necessarily an accurate representation of the true PSF for a sensor system. Further, a pre-computed PSF will not contain information specific to a given image pair such as residual shift error in the registration and artifacts of image preprocessing.

In view of the foregoing, there is a need for an improved method for obtaining an accurate estimate of the weights that should be applied to each band of multi-spectral image data to approximate the panchromatic spectral response. There is also a need for obtaining an accurate estimate of the spatial distribution of weights that should be applied to a region of pixels in the panchromatic image geometry that map to a given multi-spectral image pixel. This spatial distribution of weights can be advantageous to approximate the multi-spectral spatial response when fusing lower resolution multi-spectral image data with high spatial resolution panchromatic image data.

SUMMARY OF THE INVENTION

The invention concerns a method and system for creating a fused image from an image pair comprising a high resolution panchromatic image and lower resolution multi-spectral image. The method begins by obtaining image data defining a first image of a panchromatic image type and a second image of a multi-spectral image type. The first image has a first spatial resolution and a first spectral resolution. The second image has a second spatial resolution which is lower than the first spatial resolution and a second spectral resolution higher than the first spectral resolution. A registration process is thereafter performed on the image pair to provide a geometric mapping of points in the first image to corresponding locations in the second image.

The method also includes a step of concurrently calculating a point-spread function $\Psi_{i,j}$ for down-sampling the first image to the second spatial resolution, and a set of weights $W_\lambda$ for down-sampling the second image to the first spectral resolution. The point-spread function and the set of weights are specifically optimized to the unique characteristics of the image pair. The calculating step of the method includes building a matrix equation for concurrently solving for $\Psi_{i,j}$ and $W_\lambda$. A least-squared error method is advantageously used for solving the matrix equation. Using this technique, the point-spread function and the set of spectral weights can be calculated to minimize the squared error of radiance when each of the images comprising the image pair are mapped to a common low resolution pan image. For example, the common low resolution can be the second spatial resolution and the first spectral resolution. Once obtained, the set of weights are used to form a fused image having the first spatial resolution and the second spectral resolution.

The calculating step referenced above advantageously includes concurrently solving for $\Psi_{i,j}$ and $W_\lambda$ in the equation $$\sum_{i,j} p_{i,j} \Psi_{i,j} = P = \sum_\lambda W_\lambda M_\lambda + P_0$$

where P is the radiance of a pixel down-sampled to the second spatial resolution, $W_\lambda$ is the spectral weight for a spectral band $\lambda$ comprising the multi-spectral image, $M_\lambda$ is the radiance value of a pixel for each spectral band comprising the second image, $P_0$ is a constant offset value, $p_{i,j}$ is the radiance value of a pixel comprising the panchromatic image; and $\Psi_{i,j}$ is the point-spread function. The calculating step can also include building a matrix equation for concurrently solving for $\Psi_{i,j}$ and $W_\lambda$, and solving the matrix equation using a least squares fit method.

The method also advantageously includes using the point-spread function that has been calculated to spatially down-sample the fused image to the second spatial resolution. Thereafter, the radiance values of each optical band of the fused image can be compared with the radiance values of each optical band of the second image. If there are any significant differences, such differences can also be corrected in this step by modifying the radiance values of the pixels comprising the fused image.

The method also includes using the spectral weights to spectrally down-sample the fused image to the first spectral resolution. Thereafter, the radiance values of each pixel of the fused image can be compared with the radiance values of each pixel of the first image. If there are any significant differences, such differences can be corrected in this step by modifying the radiance values of the pixels comprising the fused image.

According to another aspect, the invention includes a system for creating a fused image from an image pair comprising a high resolution panchromatic image and lower resolution multi-spectral image. The system includes a data store for storing image data defining a first image and image data defining a second image. The first image type is a panchromatic image type and the second image type is a multi-spectral image type. The first image has a first spatial resolution and a first spectral resolution. The second image has a second spatial resolution lower than the first spatial resolution. The second image also has a second spectral resolution higher than the first spectral resolution.

The system also includes a computer processing system programmed with a suitable set of instructions for implementing the process described above. Consequently, the computer processing system is configured for concurrently calculating a point-spread function for down-sampling the first image to the second spatial resolution, and a sot of weights for down-sampling the second image to the first spectral resolution. The computer processing system is also configured for using the set of weights for forming a fused image having the first spatial resolution and the second spectral resolution. Significantly, the point-spread function and the set of weights calculated by the computer processing system are specifically optimized to the unique characteristics of the image pair using the methods described above.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirety software embodiment, or a hardware/software embodiment.

The present invention can be realized in one computer system. Alternatively, the present invention can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

The present invention can take the form of a computer program product on a computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Embodiment of the present invention will now be described with respect to FIG. 1 through FIG. 8. Some embodiments of the present invention provide methods, systems, and apparatus relating to image fusion functions including obtaining image data, registering the image data, determining calibration coefficients, and applying the calibration coefficients to specific image data. Accordingly, an embodiment including the listed functions is discussed further below.

Figure 1:
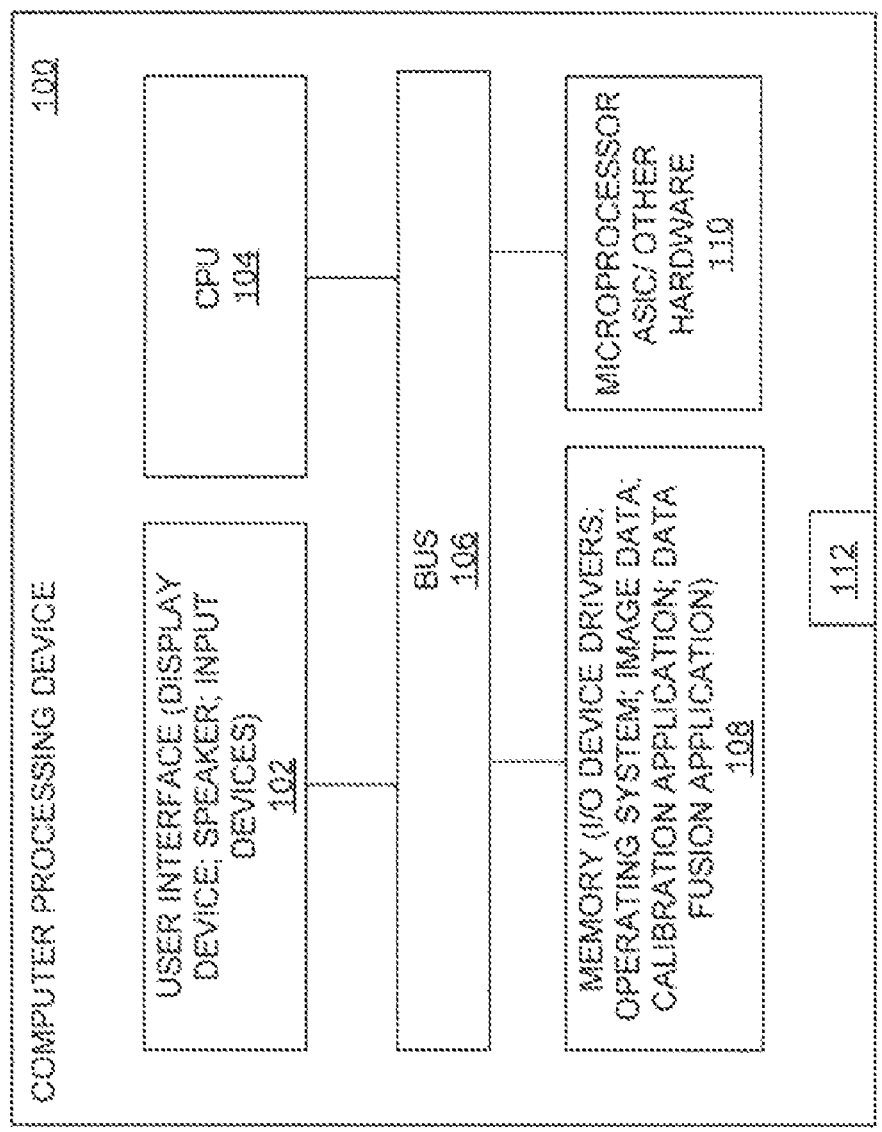
FIG. 1 is a block diagram of a computer processing device that is useful for understanding the invention.

Referring now to FIG. 1, there is provided a block diagram of a computer processing device 100. Computer processing device 100 is comprised of a system interface 112, a user interface 102, a central processing unit 104, a system bus 106, a memory 108 connected to and accessible by other portions of the computer processing device 100 through system bus 106, and hardware entities 110 connected to system bus 106. At least some of the hardware entities 110 perform actions involving access to and use of memory 108, which may be a RAM, a disk driver, and/or a CD-ROM.

User interface 102 facilitates a user action to create a request to access and launch a calibration application and/or a fusion application. User interface 102 may comprise a display screen, speakers, and an input means, such as a keypad, directional pad, a directional knob, and/or a microphone.

System interface 112 allows the computer processing device 100 to communicate with external computer processing devices through the internet, LAN, or WAN, System interface 112 also allows the computer processing device 100 to send and retrieve data from one or more external databases.

Memory 108 can include I/O device driver program code and operating system program code. Memory 108 can also include image data, calibration applications program code, and fusion applications program code. In accordance with one aspect of the invention, the image data can include high spectral data such as a multi-spectral image. The image data can also include high spatial resolution such as a panchromatic image.

Hardware entities 110 may include microprocessors, ASICs, and other hardware. Hardware entities 110 may include microprocessors programmed with an I/O device drivers and an operating system. Hardware entitles 110 may also include a microprocessor programmed with a calibration application. The calibration application can provide a system for obtaining image data for images having different spatial and spectral resolutions, registering the image data for different images, building a matrix equation, solving the matrix equation, and applying the calibration coefficients to image data for a particular image type. The calibration application will be described in greater detail below in relation to FIG. 2. Hardware entities 110 may further include a microprocessor programmed with a fusion application for combining two or more images to provide increased image content.

Those skilled in the art will appreciate that the computer processing device architecture illustrated in FIG. 1 is one possible example of a computer processing device. However, the invention is not limited in this regard and any other suitable computer processing device architecture can also be used without limitation.

Figure 2:
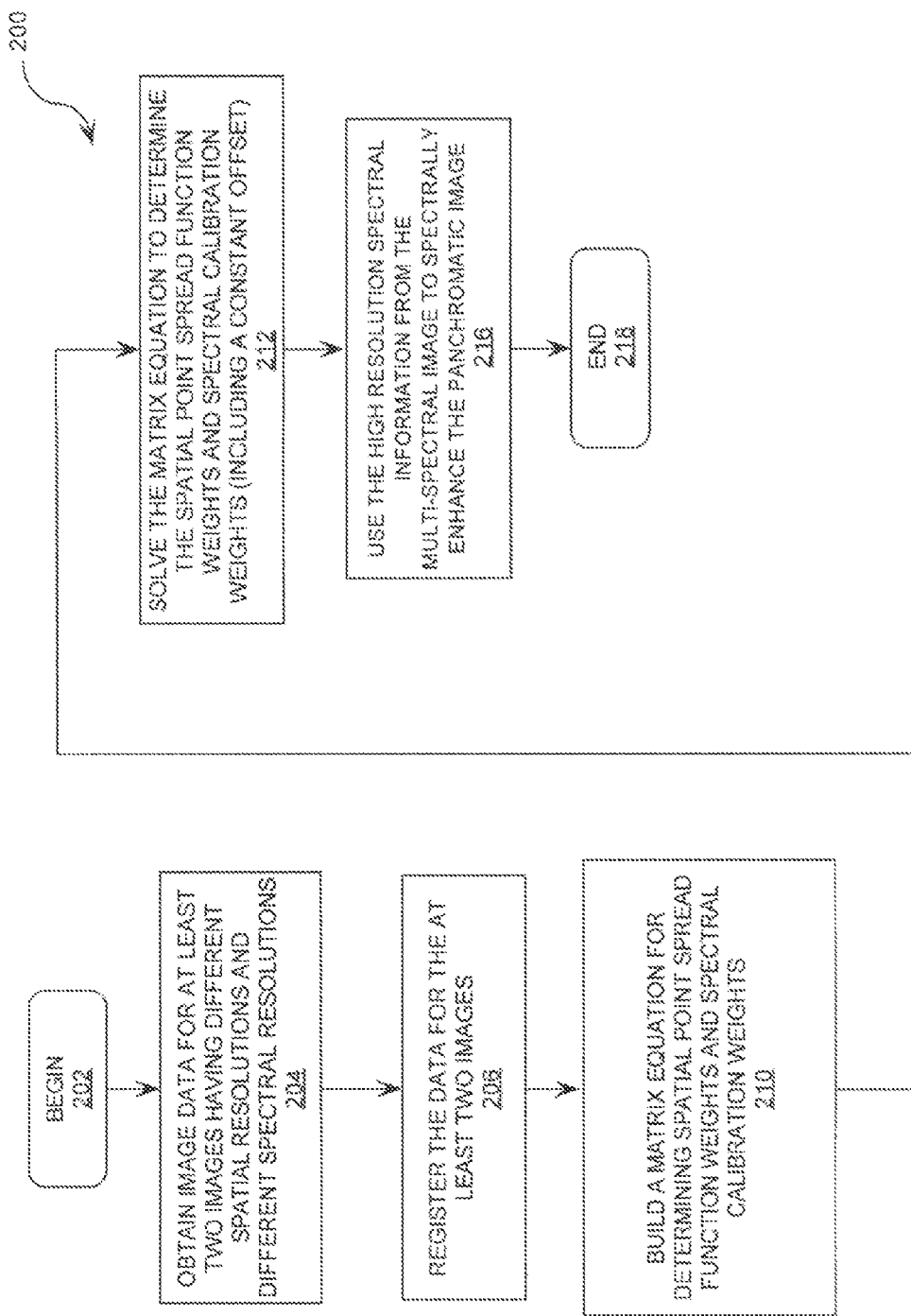
FIG. 2 is a flow diagram of a spatial/spectral calibration software routine that is useful for understanding the invention.

The present invention will now be described in greater detail in relation to FIG. 2. The spatial/spectral calibration process disclosed herein is useful for fusing a panchromatic and multi-spectral image pair. FIG. 2 and accompanying text illustrate a spatial/spectral calibration software routine in accordance with the present invention. It should be appreciated, however, that the spatial/spectral calibration software routine disclosed herein is provided for purposes of illustration only and that the present invention is not limited solely to the spatial/spectral calibration software routine shown. It should be understood that computer program code for carrying out the routines of the present invention can be written in an object orientated programming language such as Java®, Smalltalk, C++, or Visual Basic. However, the computer program code for carrying out the routines of the present invention can also be written in conventional procedural programming languages, such as "C" programming language.

As used herein, the terms "fusing" or "fused image" respectively refers to a process, or an image obtained from such a process, in which a high resolution panchromatic image is used to sharpen the resolution of the relatively low resolution multi-spectral imagery. The term "image pair" refers to a high resolution panchromatic image and a relatively low resolution multi-spectral image of the same surface or subject matter. Thus, the panchromatic image and the multi-spectral image are each comprised of image data that is closely related.

Referring again to FIG. 2, a process 200 can begin in step 202 and continue to step 204. In step 204 image data is obtained for an image pair that comprises at least two images having different spatial resolutions and different spectral resolutions. For convenience in describing the invention, it shall be assumed that the image pair is comprised of a multi-spectral image and a panchromatic image. However, it should be understood that the invention is not limited in this regard. Any other image pair having different spatial resolution and different spectral resolutions can be fused using the inventive arrangements described herein.

It will be appreciated by those skilled in the art that a fused image will be of little value if the surface imaged by a first image does not significantly overlap with the surface imaged by the second image. Accordingly, it should be understood that the image pairs referred to herein are advantageously selected to be of a common subject matter or common surface area. For example, the images can be of a common geographic area of the earth.

The image pairs described herein are further assumed to have certain other characteristics. During the time between collection of the panchromatic and multi-spectral image, moving objects such as vehicles and ocean waves are not likely to be registered correctly between the two images, leading to error in registration and calibration. If the time between the acquisitions of the images is more than a few minutes, the change in position of the sun will result in significant changes in shadows and variations in the illumination of the surface based on how well the surface normals are aligned with the sun. This can result in significant calibration and registration errors. If days pass between the collection of panchromatic and multi-spectral image, there can be significant changes in atmospheric conditions. If months pass, there can be significant changes in the surface properties due to ice, snow, rain, leaves falling from the trees, new growth. Accordingly, it is generally preferred that the panchromatic and multi-spectral image comprising each image pair are acquired from nearly the same position so as to reduce such errors. This significantly simplifies the registration to little more than shift, scale, and rotation.

Further it is preferred that the panchromatic and multi-spectral image pair is acquired within a very short time frame of each other. For example, each image is advantageously acquired within one minute of the other. Still, it will be understood by those skilled in the art that the present, invention can be utilized in connection with image pairs that do not satisfy these criteria, with degraded results. For example, the process can fee used for image pairs obtained with different sensors platforms at approximately the same time.

The image data can be processed by control processing unit 104 and stored in memory 108. The image data includes pixel data. Control processing unit 104 can be configured for populating memory 108 in a table format with such pixel data. The pixel data for the multi-spectral image data can include each pixel's electromagnetic wavelength characteristic and location on a grid. The pixel data associated with a panchromatic image can also be processed by control processing unit 104 and stored in memory 108. The pixel data for the panchromatic image can include radiance data for each pixel associated with the panchromatic image. Control processing unit 104 can be configured for populating memory 108 in accordance with a table format such that the panchromatic image data is associated with pixel locations on a grid.

Once the images are obtained, the process can continue with step 206. Step 206 concerns registration of the data for the at least two images. Techniques for registering different sets of image data are well known to persons skilled in the art. Thus, such techniques will not be described in detail herein. However, it should be appreciated that any such technique known in the art can be used with the present invention.

In general, the registration step 206 involves a determination of where each point in the panchromatic image maps to in the multi-spectral image. The registration process must generally be accomplished with great accuracy for best results. A number of conventional methods exist for achieving this mapping. Typically, they involve selecting a number of points in one image, finding where they map to in the other image, and then optimizing the coefficients of a transform. This is usually a least squares error solution that permits one to obtain a set of coefficients that minimize the squared error of mapping points from one image to another. For best results in the fusing process, the panchromatic image is preferably mapped to the multi-spectral image with an accuracy defined by a error distance which is less than a dimension defined by 0.1 panchromatic pixel.

The registration process of step 206 determines the mapping of points from the coordinates of one image to the coordinates of the other image. This mapping can be a simple as a linear transformation of the form x1=a x2+b y2+x0 or a complex transformation modeling the geometry of both sensors and the surface imaged. The additional steps of calibrating the PSF and spectral weights provide further information that is useful for defining how the spatial/spectral volume of a pixel are mapped between images.

After registering the image data in step 206, the process continues on to step 210. It will be appreciated that in order to properly combine or fuse the image data from the panchromatic image and the multi-spectral image, it is necessary to perform two calibration functions. These calibration functions include (1) determining the spectral weights of the radiance values for the bands comprising the multi-spectral image so that they accurately correspond to the radiance values in the pixels of the panchromatic image; and (2) determining a point-spread function (PSF) that accurately defines the manner in which radiance values for a plurality of pixels forming the panchromatic image should be combined to form a single radiance value of a single (lower resolution) pixel of the multi-spectral image. Step 210 is directed to a process for determining a correct set of weighting or scaling factors that can be used for accurately used for the purposes of the two calibration steps referenced above.

In order to more fully understand the calibration steps described above, it is helpful to first consider why these steps are necessary. As used herein, the term "radiance value" generally refers to a digital value assigned to a pixel which is intended to represent the intensity of light energy received by a sensor at the location defined by that pixel. In this regard, it should be understood that these radiance values may be scaled differently in two different sensors. Accordingly, it will be appreciated that the radiance values from the two different sensors must somehow be adjusted or scaled by using suitable weighting factors before the radiance values from the two different sensors can be combined together in a meaningful way. This process is referred to as calibration.

Figure 3:
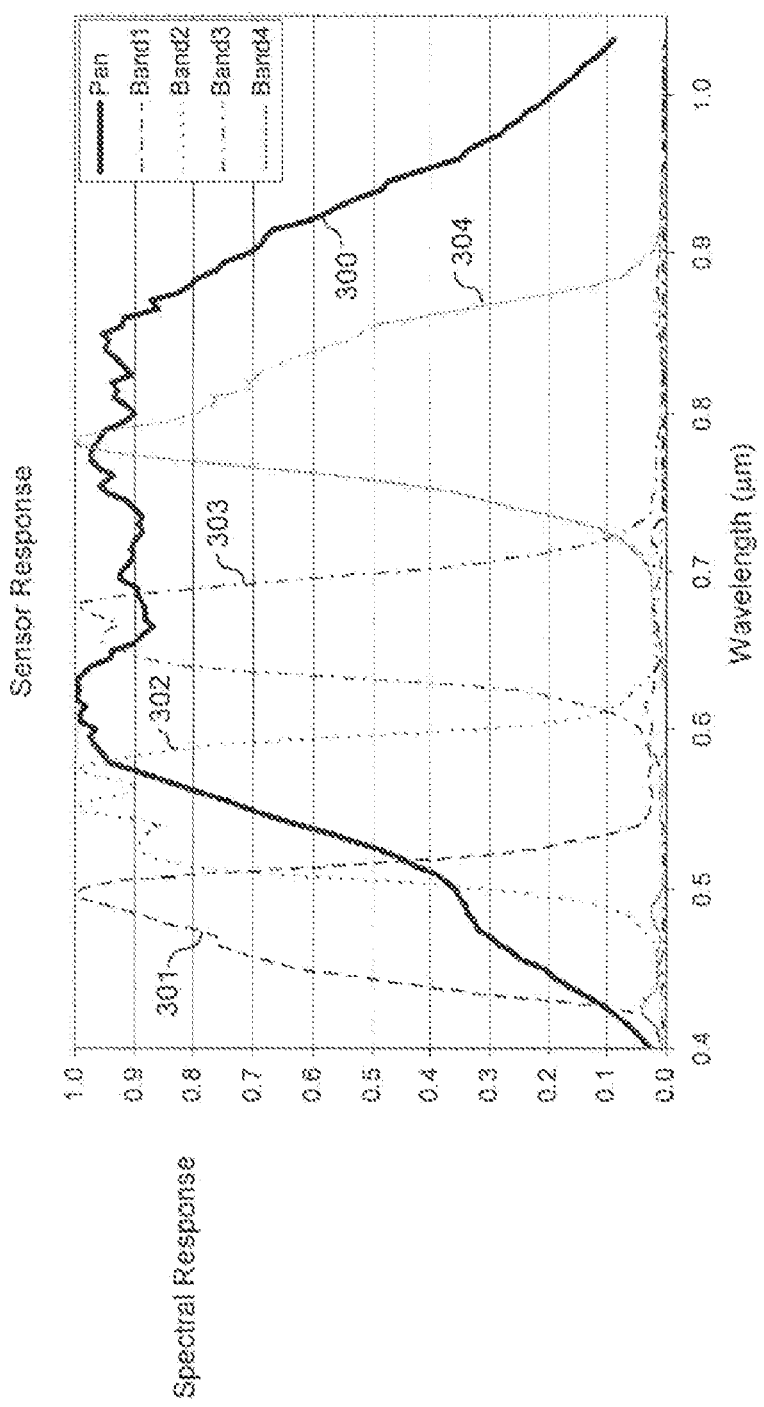
FIG. 3 is a plot showing an example of a spectral response of sensors used to create a panchromatic image and a multi-spectral image.

It is illustrative to separately consider the calibration functions (1) and (2) listed above. In the case of calibration function (1) it must be understood that the complete multi-spectral image of a particular scene is actually comprised of several image bands. In each of the several image bands the sensor is responsive to a very limited range of optical wavelengths. This concept is illustrated in FIG. 3 which shows curves 301, 302, 303, 304 which represent a sensor's response to four different bands of optical wavelengths. The sensor essentially creates one image for each optical band represented by the response curves 301, 302, 303, 304. In this example, a single multi-spectral image would be comprised of images obtained by the sensor using these four spectral bands. Those skilled in the art will appreciate that different sensor systems can have more or fewer optical bands, in contrast, the panchromatic image is a single image which is obtained by a sensor that is responsive to a much wider range of optical wavelengths. In FIG. 3, the response of the panchromatic sensor is illustrated by curve 300.

In FIG. 3, it can be seen that the response curves 301, 302, 303, 304 of the sensor for the various, multi-spectral bands can be very different as compared to the response curve 300 of the panchromatic sensor for the same wavelengths. These differences in the responsiveness of the sensor to the various optical hands will result in scaling differences as between the radiance values associated with each pixel for the multi-spectral image as compared to the panchromatic image.

Figure 4:
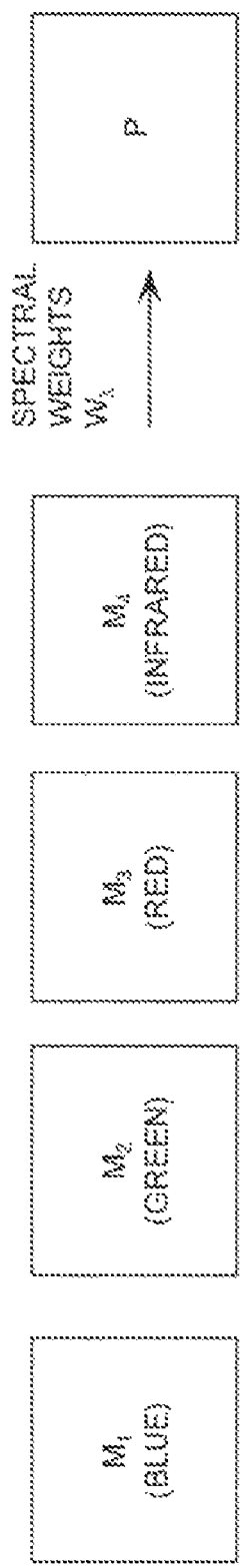
FIG. 4 is a conceptual illustration showing how spectral weights are used in a downsample processing of a multi-spectral image for decreasing the spectral resolution of the multi-spectral image.

The calibration function (1) is directed to scaling the radiance values for each pixel as measured by the multi-spectral sensor to correspond to the scaling of radiance values resulting from the panchromatic sensor. For example, consider the spectral response represented by curves 300 and 301 at 0.5 µm. The curve 301 has a spectral response of approximately 1.0 whereas the spectral response of the panchromatic sensor shows an average spectral response in the range of about 0.35. Ignoring for the moment the response of curve 302 in the wavelength range defined by curve 301, the radiance values for pixels in a multi-spectral image using a sensor having the characteristics of response curve 301 would likely need to be scaled by a weighting value of about 0.35 in order for such radiance values to be properly calibrated to those values measured by a sensor having the response indicated by curve 300. In general, proper spectral calibration would require that the pixel radiance values associated with each spectral band in FIG. 3 would need to be added together to obtain a total radians value that is property scaled to the radiance values obtained using a sensor having the response defined by curve 300. This process is illustrated in FIG. 4.

Mathematically, the foregoing process can be expressed as follows in equation (1):

$$P_{1,\lambda} = \sum_{\lambda} W_\lambda M_{i,j,\lambda} + P_0$$

Where
$P_{i,j}$ is the pan radiance of each down-sampled pixel;
$W_\lambda$ is are the spectral weights for each of the spectral bands;
$M_{i,j,\lambda}$ is the radiance value for each pixel for each spectral band comprising the multi-spectral image; and
$P_0$ is a constant offset value.

Figure 5:
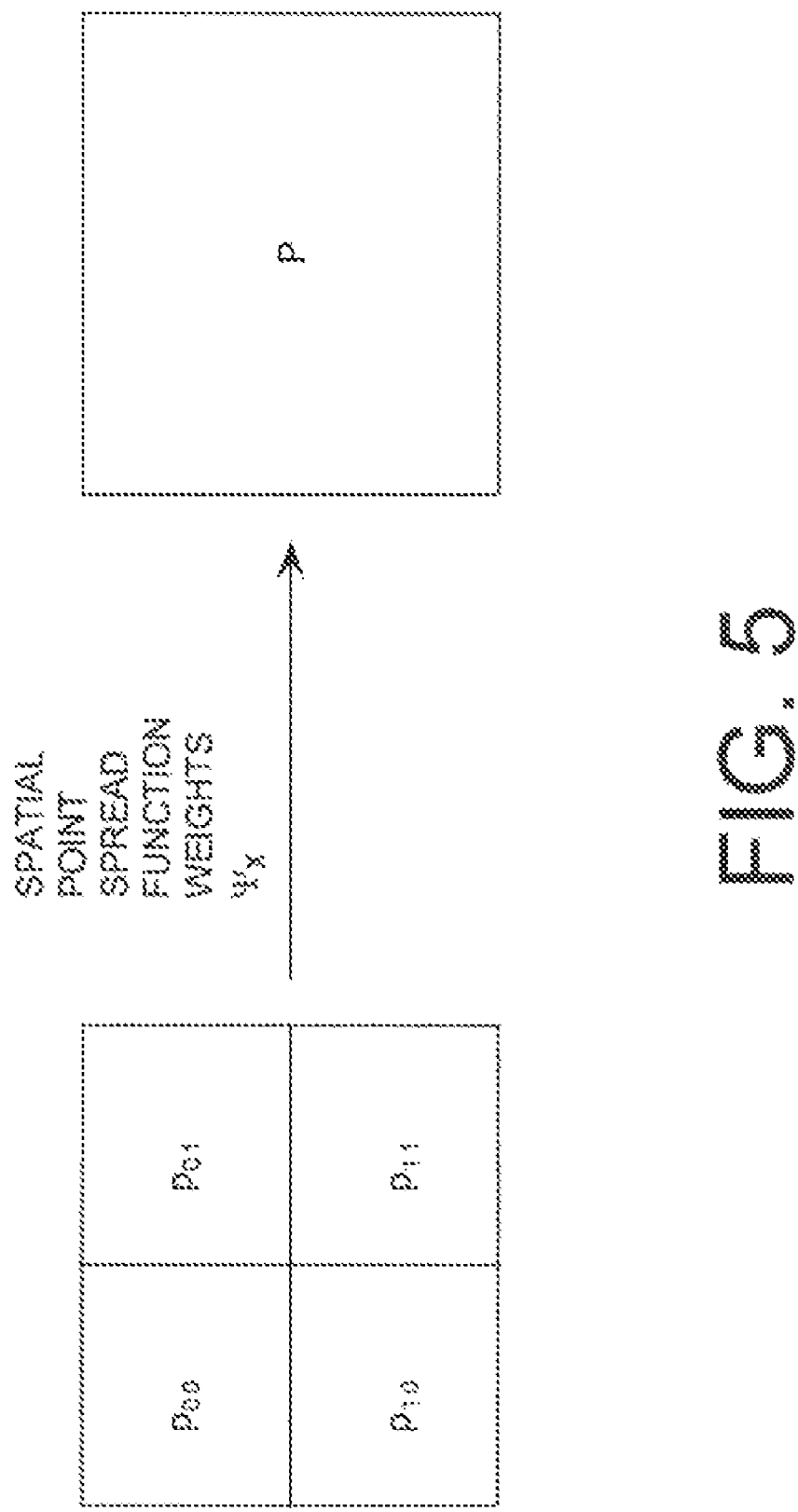
FIG. 5 is a conceptual illustration showing how a point-spread function is used in a downsample processing of a panchromatic image for decreasing the spatial resolution of the panchromatic image.
Figure 6:
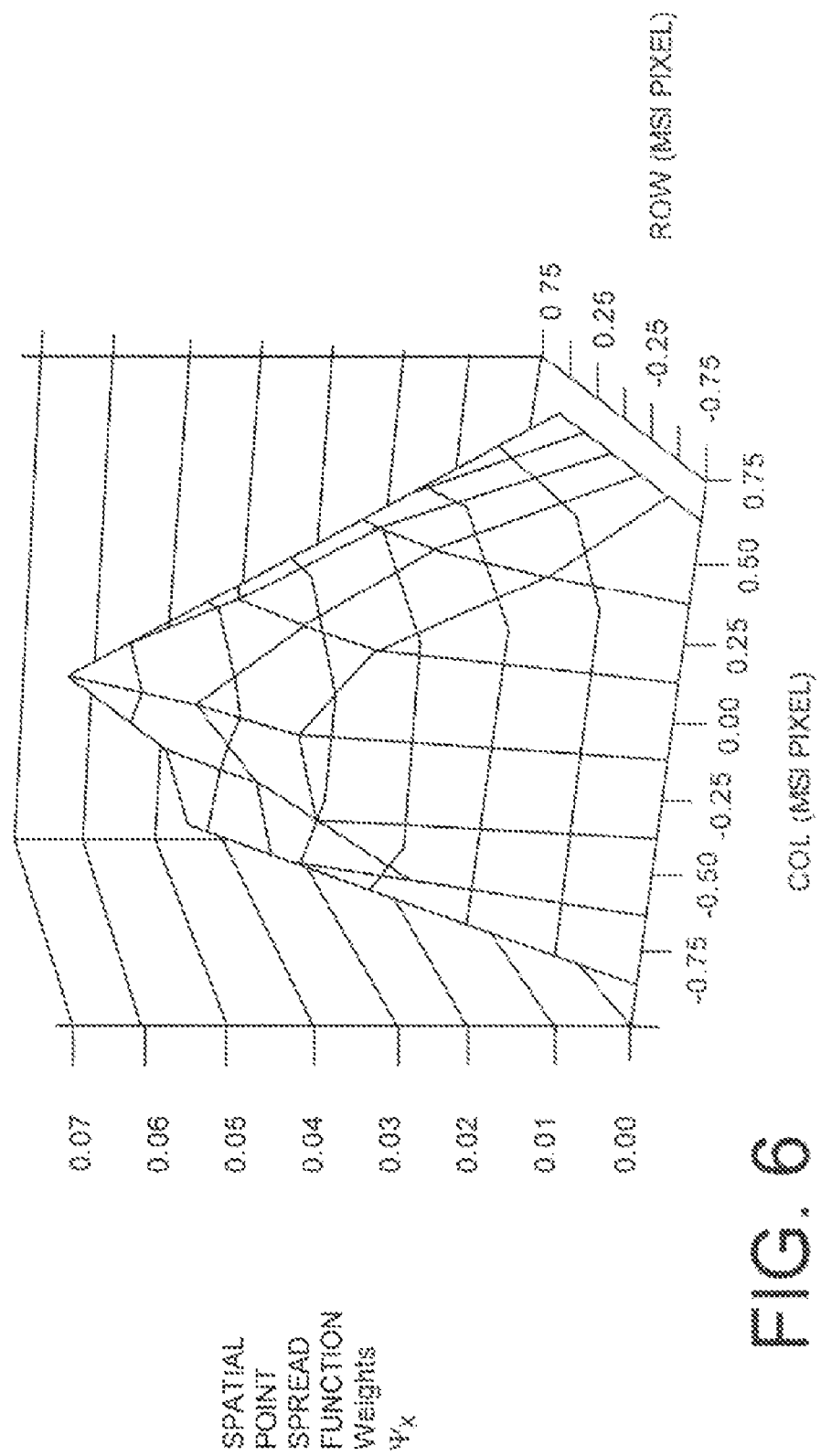
FIG. 6 is a two-dimensional graph which shows an example of a point-spread function.

Turning now to FIG. 5, it can be observed that calibration function (2) as referenced above involves spatial scaling rather than spectral scaling. Spatial down-sampling involves down-sampling of radiance values of a plurality of high resolution pixels $p_{00}, p_{01}, p_{10}, p_{11}$ from the panchromatic image to determine a single radiance value for a single lower resolution pixel. A simple averaging process of the radiance values from the high resolution pixels will not give an accurate result because it does not properly account for the point-spread function (PSF) associated with the optics, sensor, and other processing that may have been performed to generate the panchromatic image.

The PSF can be thought of as a mathematical function or table based characterization of the blurring that occurs to a point of light as it processed by the optics, sensor, and other image processing functions associated with the creation of the panchromatic image. FIG. 8 is a graphical representation of an example point-spread function that is useful for understanding this concept. An accurate characterization or representation of the PSF can allow radiance values for different high-resolution pixels within a group of pixels to more accurately be down-sampled to a single larger pixel. This is conceptually illustrated in FIG. 5, which shows a set of four high-resolution pixels being down-sampled to a single larger lower resolution pixel. The PSF represented by $\Psi_x$ operates as a selective weighting factor on each of the high resolution pixels $p_{00}, p_{01}, p_{10}, p_{11}$ to more accurately down-sample the radiance values of these pixels to a single value associated with a larger pixel P. More particularly, the radiance values for the pixels of the panchromatic image are convolved with the PSF to determine a down-sampled value for a single larger, lower resolution pixel.

The foregoing process can be mathematically expressed in Equation (2) as:

$$P = \sum_{i,j} p_{i,j} \Psi_{i,j}$$

where:
$p_{i,j}$ is the radiance value of a high resolution pixel comprising the panchromatic image; and
$\Psi_{i,j}$ is the point-spread function or PSF.

Equations (1) and (2) represent two ways of generating a down-sampled (lower resolution) panchromatic image. One approach begins with the multi-spectral image and the other approach begins with the panchromatic image. However, both approaches yield a lower resolution panchromatic image. Accordingly, the foregoing Equations (1) and (2) can be used together to calculate the actual values for $W_\lambda$ (the spectral weights for each of the spectral bands) and $\Psi_{i,j}$ (the point-spread function or PSF). For each down-sampled pixel, we have Equation (3):

$$\sum_{i,j} p_{i,j} \Psi_{i,j} = P = \sum_\lambda W_\lambda M_\lambda + P_0$$

Where:
$P_j$ is the pan radiance of each down-sampled pixel;
$W_\lambda$ is are the spectral weights for each of the spectral bands;
$M_\lambda$ is the radiance value for each pixel for each spectral band comprising the multi-spectral image;
$P_0$ is a constant offset value
$p_{i,j}$ is the radiance value of a high resolution pixel comprising the panchromatic image; and
$\Psi_{i,j}$ is the point-spread function or PSF.

Using the foregoing equation (3) a matrix equation can be assembled for calculating the values $W_\lambda$ (the spectral weights for each of the spectral bands) and $\Psi_{i,j}$ (the point-spread function).

We can rewrite equation (3), a linear combination of known intensities and unknown weights, as a linear system of equations for all pixels associated with the multi-spectral image in matrix from as the following $$A x = h \qquad \text{Equation (4)}$$

where A is the matrix populated by the specified radiance values from the panchromatic and multi-spectral images, x is a vector of unknowns (the PSF and spectral weights), and b is the vector of numerical constants (e.g. 0, 1.) The matrix equation (4) can thus be written as follows:

$$\begin{vmatrix} 1 & \cdots & 1 & 0 & \cdots & 0 & 0 \\ p_{0,0} & \cdots & p_{n,n} & -M_0 & \cdots & -M_p & -1 \\ \vdots & \vdots & \vdots & \vdots & \vdots & \vdots & \vdots \end{vmatrix} * \begin{vmatrix} \Psi \\ W \\ P_0 \end{vmatrix} = \begin{vmatrix} 1 \\ 0 \\ \vdots \end{vmatrix} \qquad \text{Equation (5)}$$

Those skilled in the art will appreciate that the first n×n columns of the matrix are related to the portions of the high resolution panchromatic pixels which are modulated by the PSF. These values are the first n×n unknowns in the vector multiplied by the matrix. The next group of columns of the matrix are the negative of the MSI radiance values. These values are modulated by the spectral weights W and represent the next group of unknowns in the vector multiplied by the matrix. The last column of the matrix is a constant −1 for all values except the first row. This −1 value is used to account for the constant offset $P_0$, and represents the last unknown in the vector multiplied by the matrix.

The first row of the matrix equation imposes the constraint that n×n elements of the PSF sums to 1, which is a defining characteristic of a point-spread function. In this regard it may be noted that the first row of the constant vector on the far right of equation (5) is shown to have a value of 1. Also, in the first row of the matrix on the far left of equation (5), the values in the first group of columns are set to 1 whereas the values in the first row of the remaining columns are set to 0. These values are chosen in this way so as to select the first n×n unknowns which are the elements of the PSF.

The second row of the matrix equation enforces the requirement that the high resolution panchromatic radiance values spectrally down-sampled by the PSF ($p_{0,0} \ldots p_{n,n}$), equal the spectrally down-sampled MSI radiance values (−M₀ ... −M_b). The zero value in the second row of the constant vector on the far right of equation (5) reflects this balance. The structure of the second row is repeated as a separate row in the matrix equation for each pixel in the MSI image. Those skilled in the art will readily appreciate that a given row of this matrix reduces to Equation 3 for a specific pixel of the multi-spectral image.

$$p_{0,0}\Psi_{0,0} + \ldots + p_{n,n}\Psi_{n,n} - M_0 W_0 - \ldots - M_b W_b - P_0 = 0$$

The process in FIG. 2 continues in step 212 by solving the matrix equation (4) to determine the spatial PSF weighting factors $\Psi_{i,j}$ and the spectral calibration weighting factors $W_\lambda$, including a constant offset $P_0$. The system of equations defined by matrix equation (4) is typically over determined due to the large number of pixels in the multi-spectral image and the relatively few unknown weights being sought The solution to the equation is found by using conventional techniques, such as the well known least-squares method.

$$[A_r A]x = A_r b$$

Where multiplying from the left by the transpose of the matrix results in a symmetric matrix equation. There are many well know methods for efficiently solving matrix equations of this form.

Those skilled in the art will readily appreciate that the values $W_\lambda$ (the spectral weights for each of the spectral bands) and $\Psi_{i,j}$ (the point-spread function) are advantageous for use in various down-sampling and image fusion processes. For example, the weighting values thus obtained can be used in step 216 for enhancing a panchromatic image with high resolution spectral information.

In step 216, the high resolution spectral information from the multi-spectral image is used to spectrally enhance the panchromatic image in a fusing process. In particular, this can be accomplished by using the spectral weights for each of the spectral bands ($W_\lambda$) determined in step 212. This process can typically involve several steps. The process can begin by creating a number of duplicates images of the panchromatic image. Specifically, one image layer can be created for each of the multi-spectral bands of image data. For example, with the sensor having a multi-spectral response as shown in FIG. 3, four image layers could be created, one for each of the spectral bands associated with each response curve 301, 302, 303, 304. Each of the duplicate panchromatic images can be used to form one image layer for the spectrally enhanced panchromatic image (fused image).

The multi-spectral image data and the weighting factors for a particular spectral band are used together to modify a respective panchromatic image layer. In particular, the radiance value of each pixel in a first panchromatic image layer can be replaced with a scaled radiance value. The scaled radiance value can be obtained by using the radiance value for a pixel of the multi-spectral image that is mapped to the particular pixel in the panchromatic image using the mapping techniques described above. The radiance value of a pixel from the multi-spectral image used to scale each panchromatic pixel is scaled by the weighting factor ($W_\lambda$) as calculated above. Since the pixels of the multi-spectral image have a lower spatial resolution, the radiance value from one pixel of the multi-spectral image can be used for a plurality of high resolution pixels from the panchromatic image layer. This process can be repeated for each band of optical wavelengths comprising the multi-spectral image. The result is a set of image layers that have the spatial resolution of the panchromatic image, but together can also include the spectral information from the multi-spectral image.

Additional image processing steps can be performed to further enhance the resulting fused image. For example, the point-spread function that has been calculated using the foregoing techniques can be subsequently used to spatially down-sample the fused image to the spatial resolution of the multi-spectral image. Thereafter, the radiance values of each optical band of the fused image can be compared with the radiance values of each optical band of the multi-spectral image. Any differences can be corrected by modifying the radiance values of the pixels comprising the fused image so that they more closely conform to the multi-spectral image.

Further, the spectral weights calculated above can be used to spectrally down-sample the fused image to the spectral resolution of the panchromatic image. Thereafter, the radiance values of each pixel of the fused image can be compared with the radiance values of each pixel of the panchromatic image. Any differences can be corrected in this step by modifying the radiance values of the pixels comprising the fused image so that they more closely conform to the panchromatic image.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for creating a fused image from an image pair comprising a high resolution panchromatic image and lower resolution multi-spectral image, comprising:
   obtaining image data defining a first image of a panchromatic image type, said first image having a first spatial resolution and a first spectral resolution;
   obtaining image data defining a second image of a multi-spectral image type, said second image having a second spatial resolution lower than said first spatial resolution and a second spectral resolution higher than said first spectral resolution;
   concurrently calculating a point-spread function for down-sampling said first image to said second spatial resolution, and a set of weights for down-sampling said second image to said first spectral resolution;
   using said set of weights, forming a fused image having said first spatial resolution and said second spectral resolution;
   wherein said point-spread function and said set of weights are specifically optimized to the unique characteristics of the image pair.

2. A method for creating a fused image from an image pair comprising a high resolution panchromatic image and lower resolution multi-spectral image, comprising:
   obtaining image data defining a first image of a panchromatic image type, said first image having a first spatial resolution and a first spectral resolution;
   obtaining image data defining a second image of a multi-spectral image type, said second image having a second spatial resolution lower than said first spatial resolution and a second spectral resolution higher than said first spectral resolution;

concurrently calculating a point-spread function for down-sampling said first image to said second spatial resolution, and a set of weights for down-sampling said second image to said first spectral resolution; and using said set of weights, forming a fused image having said first spatial resolution and said second spectral resolution;

wherein said point-spread function and said set of weights are specifically optimized to the unique characteristics of the image pair; and wherein said calculating step further comprises calculating said point-spread function and said set of spectral weights so as to minimize the squared error of radiance when each of the images comprising the image pair are mapped to a common low resolution pan image.

3. The method according to claim 1, further comprising selecting said common low resolution to be comprised of the second spatial resolution and said first spectral resolution.

4. A method for creating a fused image from an image pair comprising a high resolution panchromatic image and lower resolution multi-spectral image, comprising:

obtaining image data defining a first image of a panchromatic image type, said first image having a first spatial resolution and a first spectral resolution;

obtaining image data defining a second image of a multi-spectral image type, said second image having a second spatial resolution lower than said first spatial resolution and a second spectral resolution higher than said first spectral resolution;

concurrently calculating a point-spread function for down-sampling said first image to said second spatial resolution, and a set of weights for down-sampling said second image to said first spectral resolution; and using said set of weights, forming a fused image having said first spatial resolution and said second spectral resolution;

wherein said point-spread function and said set of weights are specifically optimized to the unique characteristics of the image pair; and wherein said calculating step is further comprised concurrently solving for $\Psi_{i,j}$ and $W_\lambda$ in the equation $$\sum_{i,j} p_{i,j}\Psi_{i,j} = P = \sum_\lambda W_\lambda M_\lambda + P_0$$

where P is the radiance of a pixel down-sampled to said second spatial resolution, $W_\lambda$ is the spectral weight for a spectral band $\lambda$ comprising said multi-spectral image, $M_\lambda$ is the radiance value of a pixel for each spectral band comprising the second image, $P_0$ is a constant offset value, $p_{i,j}$ is the radiance value of a pixel comprising the panchromatic image; and $\Psi_{i,j}$ the point-spread function.

5. The method according to claim 4, further comprising building a matrix equation for concurrently solving for and $\Psi_{i,j}$ and $W_\lambda$.

6. The method according to claim 5, further comprising solving said matrix equation using a least squares fit method.

7. The method according to claim 1, wherein said method of forming a fused image further comprises the step of using said PSF to spatially down-sample the fused image to said second spatial resolution, and then enforcing consistency of radiance values of each optical band of said fused image with the radiance values of each optical band of the second image.

8. The method according to claim 7, wherein said enforcing step comprises automatically modifying at least one pixel radiance value of said fused image if said radiance values of each optical band of said fused image are not consistent with the radiance values of each optical band of the second image.

9. The method according to claim 1, wherein said method of forming a fused image further comprises the step of using said spectral weights to spectrally down-sample the fused image to said first spectral resolution, and then enforcing consistency of radiance values of each pixel of said fused image with the radiance values of each pixel of first image.

10. The method according to claim 9, wherein said enforcing step comprises automatically modifying at least one pixel radiance value of said fused image if said radiance values of each pixel of said fused image are not consistent with the radiance values of each pixel of said first image.

11. The method according to claim 1, prior to said calculating step, performing a registration process on said image pair to provide a geometric mapping of pixels in said first image to locations in said second image.

12. A system for creating a fused image from an image pair comprising a high resolution panchromatic image and lower resolution multi-spectral image, comprising:

a data store for storing image data defining a first image of a panchromatic image type, said first image having a first spatial resolution and a first spectral resolution, and image data defining a second image of a multi-spectral image type, said second image having a second spatial resolution lower than said first spatial resolution and a second spectral resolution higher than said first spectral resolution;

processing means for concurrently calculating a point-spread function for down-sampling said first image to said second spatial resolution, and a set of weights for down-sampling said second image to said first spectral resolution; and using said set of weights, forming a fused image having said first spatial resolution and said second spectral resolution;

wherein said point-spread function and said set of weights are specifically optimized to the unique characteristics of the image pair.

13. A system for creating a fused image from an image pair comprising a high resolution panchromatic image and lower resolution multi-spectral image, comprising:

a data store for storing image data defining a first image of a panchromatic image type, said first image having a first spatial resolution and a first spectral resolution, and image data defining a second image of a multi-spectral image type, said second image having a second spatial resolution lower than said first spatial resolution and a second spectral resolution higher than said first spectral resolution;

processing means for concurrently calculating a point-spread function for down-sampling said first image to said second spatial resolution, and a set of weights for down-sampling said second image to said first spectral resolution; and using said set of weights, forming a fused image having said first spatial resolution and said second spectral resolution;

wherein said point-spread function and said set of weights are specifically optimized to the unique characteristics of the image pair; and wherein said point-spread function and said set of spectral weights minimizes the squared error of radiance when each of the images comprising the image pair are mapped to a common low resolution pan image.

14. The system according to claim 12, wherein said common low resolution is the second spatial resolution and said first spectral resolution.

15. A system for creating a fused image from an image pair comprising a high resolution panchromatic image and lower resolution multi-spectral image, comprising:
a data store for storing image data defining a first image of a panchromatic image type, said first image having a first spatial resolution and a first spectral resolution, and image data defining a second image of a multi-spectral image type, said second image having a second spatial resolution lower than said first spatial resolution and a second spectral resolution higher than said first spectral resolution;
processing means for
concurrently calculating a point-spread function for down-sampling said first image to said second spatial resolution, and a set of weights for down-sampling said second image to said first spectral resolution; and
using said set of weights, forming a fused image having said first spatial resolution and said second spectral resolution;
wherein said point-spread function and said set of weights are specifically to optimized to the unique characteristics of the image pair; and
wherein said processing means concurrently solves for $\Psi_{i,j}$ and $W_\lambda$ in the equation $$\sum_{i,j} p_{i,j} \Psi_{i,j} = P = \sum_\lambda W_\lambda M_\lambda + P_0$$

where P is the radiance of a pixel down-sampled to said second spatial resolution, $W_\lambda$ is the spectral weight for a spectral band $\lambda$, comprising said multi-spectral image, $M_\lambda$ is the radiance value of a pixel for each spectral band comprising the second image, $P_0$ is a constant offset value, $p_{i,j}$ is the radiance value of a pixel comprising the panchromatic image; and $\Psi_{i,j}$ is the point-spread function.

16. The system according to claim 15, wherein said processing means is configured for building a matrix equation for concurrently solving for $\Psi_{i,j}$ and $W_\lambda$.

17. The system according to claim 16, wherein said processing means is further configured for solving said matrix equation using a least squares fit method.

18. The system according to claim 12, wherein said processing means is configured to forming said fused image by using said point-spread function to spatially down-sample the fused image to said second spatial resolution, and then enforcing consistency of radiance values of each optical band of said fused image with the radiance values of each optical band of the second image.

19. The system according to claim 18, wherein said processing means is configured to automatically modify at least one pixel radiance value of said fused image if said radiance values of each optical band of said fused image are not consistent with the radiance values of each optical band of the second image.

20. The system according to claim 12, wherein said processing means is configured to form said fused image by using said spectral weights to down-sample the fused image to said first spectral resolution, and then enforcing consistency of radiance values of each pixel of said fused image with the radiance values of each pixel of first image.

21. The system according to claim 20, wherein said processing means is configured to automatically modify at least one pixel radiance value of said fused image if said radiance values of each pixel of said fused image are not consistent with the radiance values of each pixel of said first image.

22. The system according to claim 12, wherein said processing means is further configured for, performing a registration process on said image pair to provide a geometric mapping of pixels in said first image to locations in said second image.

* * * * *